United States Patent
Morita et al.

(10) Patent No.: US 10,250,652 B2
(45) Date of Patent: Apr. 2, 2019

(54) DATA TRANSMISSION SYSTEM, TERMINAL DEVICE, PROGRAM, AND METHOD

(71) Applicants: Kenichiro Morita, Tokyo (JP); Takuya Imai, Tokyo (JP); Shoh Nagamine, Kanagawa (JP)

(72) Inventors: Kenichiro Morita, Tokyo (JP); Takuya Imai, Tokyo (JP); Shoh Nagamine, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 207 days.

(21) Appl. No.: 15/122,857

(22) PCT Filed: Feb. 4, 2015

(86) PCT No.: PCT/JP2015/053139
§ 371 (c)(1),
(2) Date: Aug. 31, 2016

(87) PCT Pub. No.: WO2015/133216
PCT Pub. Date: Sep. 11, 2015

(65) Prior Publication Data
US 2017/0085604 A1    Mar. 23, 2017

(30) Foreign Application Priority Data
Mar. 5, 2014   (JP) .................. 2014-042279

(51) Int. Cl.
*H04L 29/06*    (2006.01)
*G06F 13/00*    (2006.01)
(Continued)

(52) U.S. Cl.
CPC ............ *H04L 65/403* (2013.01); *G06F 13/00* (2013.01); *H04L 43/0852* (2013.01);
(Continued)

(58) Field of Classification Search
CPC ... H04L 65/403; H04L 43/0852; H04L 47/11; H04L 47/24; H04L 65/00; H04L 67/28; G06F 13/00; H04N 7/15
See application file for complete search history.

(56) References Cited

U.S. PATENT DOCUMENTS

| 5,796,957 A | 8/1998 | Yamamoto et al. |
| 2002/0052975 A1 | 5/2002 | Yamamoto et al. |

(Continued)

FOREIGN PATENT DOCUMENTS

| EP | 1 569 451 A2 | 8/2005 |
| EP | 2 323 384 A1 | 5/2011 |

(Continued)

OTHER PUBLICATIONS

Extended European Search Report dated Jan. 25, 2017 in Patent Application No. 15758425.1.

(Continued)

*Primary Examiner* — Melvin C Marcelo
(74) *Attorney, Agent, or Firm* — Oblon, McClelland, Maier & Neustadt, L.L.P.

(57) ABSTRACT

A data transmission system including a plurality of terminal devices that are connected to a communication network and that transmit or receive content data among the terminal devices. At least one of the terminal devices that receives the content data includes a code amount change requesting unit that, based on an output time interval of an output signal corresponding to predetermined content data, transmits a code amount reduction request to request reduction of a code amount of the predetermined content data while designating a transmission source of the content data as a destination; and a code amount changing unit that, in response to a code (Continued)

amount reduction request transmitted from another terminal device, reduces a code amount of corresponding content data.

12 Claims, 17 Drawing Sheets

(51) Int. Cl.
*H04N 7/15* (2006.01)
*H04L 12/26* (2006.01)
*H04L 29/08* (2006.01)
*H04L 12/841* (2013.01)
*H04L 12/801* (2013.01)
*H04L 12/851* (2013.01)

(52) U.S. Cl.
CPC ............ *H04L 47/283* (2013.01); *H04L 47/29* (2013.01); *H04L 67/28* (2013.01); *H04N 7/15* (2013.01); *H04L 47/24* (2013.01)

(56) References Cited

U.S. PATENT DOCUMENTS

| | | |
|---|---|---|
| 2011/0239264 A1 | 9/2011 | Goto et al. |
| 2012/0005161 A1 | 1/2012 | Qi |
| 2012/0069132 A1 | 3/2012 | Kato |
| 2012/0307829 A1 | 12/2012 | Hyoudou |
| 2014/0118475 A1 | 5/2014 | Nagamine et al. |
| 2014/0240450 A1 | 8/2014 | Morita et al. |
| 2014/0368410 A1 | 12/2014 | Imai et al. |
| 2017/0012793 A1* | 1/2017 | Morita ................ H04L 65/1083 |

FOREIGN PATENT DOCUMENTS

| | | | |
|---|---|---|---|
| JP | 10-222439 A | 8/1998 | |
| JP | 2004-007317 | 1/2004 | |
| JP | 2005-341076 A | 12/2005 | |
| JP | 2007-194823 | 8/2007 | |
| JP | 2010-239389 | 10/2010 | |
| JP | 2010-258850 | 11/2010 | |
| JP | 2012-085269 | 4/2012 | |
| JP | 5000141 | 5/2012 | |
| JP | WO 2012086844 A1 * | 6/2012 | ............ H04L 65/80 |

OTHER PUBLICATIONS

International Search Report dated Apr. 21, 2015 in PCT/JP2015/053139 filed on Feb. 4, 2015.

* cited by examiner

FIG.7

500
TERMINAL AUTHENTICATION
MANAGEMENT TABLE

| TERMINAL ID | PASSWORD |
|---|---|
| XTK0001 | 1234 |
| ⋮ | ⋮ |
| XOS0002 | 3456 |
| ⋮ | ⋮ |
| YOS0003 | 5678 |
| ⋮ | ⋮ |

FIG.8

502
TERMINAL MANAGEMENT TABLE

| TERMINAL ID | TERMINAL NAME | OPERATION STATE | RECEPTION DATE AND TIME | IP ADDRESS |
|---|---|---|---|---|
| XTK0001 | COMPANY X TOKYO HEAD OFFICE TERMINAL 1 | ONLINE (TRANSMISSION IS POSSIBLE) | 2014.11.10.13:40 | 1.2.1.3 |
| XTK0002 | COMPANY X TOKYO HEAD OFFICE TERMINAL 2 | ONLINE (TRANSMISSION IS POSSIBLE) | 2014.11.10.12:00 | 1.2.1.4 |
| XTK0003 | COMPANY X TOKYO HEAD OFFICE TERMINAL 3 | OFFLINE | 2014.11.09.12:40 | 1.2.1.5 |
| ... | ... | ... | ... | ... |
| XOS0001 | COMPANY X OSAKA BRANCH TERMINAL 1 | ONLINE (IN TRANSMISSION) | 2014.11.10.13:45 | 1.2.2.3 |
| XOS0002 | COMPANY X OSAKA BRANCH TERMINAL 2 | OFFLINE | 2014.11.10.10:30 | 1.2.2.4 |
| XOS0003 | COMPANY X OSAKA BRANCH TERMINAL 3 | ONLINE (TRANSMISSION IS POSSIBLE) | 2014.11.10.13:50 | 1.2.2.5 |
| ... | ... | ... | ... | ... |
| YOS0001 | COMPANY Y OSAKA BUSINESS OFFICE TERMINAL 1 | OFFLINE | 2014.11.09.11:25 | 1.2.3.3 |
| YOS0002 | COMPANY Y OSAKA BUSINESS OFFICE TERMINAL 2 | ONLINE (TEMPORARILY SUSPENDED) | 2014.11.10.12:45 | 1.2.3.4 |
| YOS0003 | COMPANY Y OSAKA BUSINESS OFFICE TERMINAL 3 | ONLINE (TRANSMISSION IS POSSIBLE) | 2014.11.10.12:45 | 1.2.3.5 |
| ... | ... | ... | ... | ... |

FIG.9

504
DESTINATION LIST MANAGEMENT TABLE

| TRANSMISSION SOURCE TERMINAL (TERMINAL ID) | DESTINATION TERMINAL (TERMINAL ID) |
|---|---|
| XTK0001 | XTK0002, XTK0003, XTK0004, ⋯ ⋯, XOS001, XOS002, ⋯ |
| XTK0002 | XTK0001, XTK0003, XTK0004, ⋯ ⋯, XOS001, XOS002, ⋯ |
| XTK0003 | XTK0001, XTK0002, XTK0004, ⋯ ⋯, XOS001, XOS002, ⋯ |
| ⋮ | ⋮ |
| XOS0001 | XOS0002, XOS0003, XOS0004, ⋯ ⋯, YOS001, YOS002, ⋯ |
| XOS0002 | XOS0001, XOS0003, XOS0004, ⋯ ⋯, YOS001, YOS002, ⋯ |
| XOS0003 | XOS0001, XOS0002, XOS0004, ⋯ ⋯, YOS001, YOS002, ⋯ |
| ⋮ | ⋮ |
| YOS0001 | YOS0002, YOS0003, YOS0004, ⋯ ⋯, XTJ001, XTJ002, ⋯ |
| YOS0002 | YOS0001, YOS0003, YOS0004, ⋯ ⋯, XTJ001, XTJ002, ⋯ |
| YOS0003 | YOS0001, YOS0002, YOS0004, ⋯ ⋯, XTJ001, XTJ002, ⋯ |
| ⋮ | ⋮ |

FIG.11

| DESTINATION LIST | | |
|---|---|---|
| ONLINE (TRANSMISSION IS POSSIBLE) | XTK0002 | COMPANY X TOKYO HEAD OFFICE TERMINAL 2 |
| OFFLINE | XTK0003 | COMPANY X TOKYO HEAD OFFICE TERMINAL 3 |
| ONLINE (TRANSMISSION IS POSSIBLE) | XTK0004 | COMPANY X TOKYO HEAD OFFICE TERMINAL 4 |
| ONLINE (BUSY) | XTK0005 | COMPANY X TOKYO HEAD OFFICE TERMINAL 5 |
| OFFLINE | XTK0006 | COMPANY X TOKYO HEAD OFFICE TERMINAL 6 |
| OFFLINE | XTK0007 | COMPANY X TOKYO HEAD OFFICE |

FIG.14

600
REDUCTION REQUEST HISTORY MANAGEMENT TABLE (a)

| SESSION ID | DATA ID | TERMINAL ID OF REDUCTION REQUEST SOURCE (CAUSE INFORMATION) |
|---|---|---|
| s0001 | XTK0011A | — |
| s0002 | XTK0012V | — |
| s0003 | XOS0021A | — |
| s0004 | XOS0022V | — |
| s0005 | YOS0031A | — |
| s0006 | YOS0032V | — |
| ⋮ | ⋮ | ⋮ |

600
REDUCTION REQUEST HISTORY MANAGEMENT TABLE (b)

| SESSION ID | DATA ID | TERMINAL ID OF REDUCTION REQUEST SOURCE (CAUSE INFORMATION) |
|---|---|---|
| s0001 | XTK0011A | — |
| s0002 | XTK0012V | — |
| s0003 | XOS0021A | XTK0001 (Network) |
| s0004 | XOS0022V | — |
| s0005 | YOS0031A | XOS0002 (Network), XTK0003 (CPU) |
| s0006 | YOS0032V | — |
| ⋮ | ⋮ | ⋮ |

FIG.15

700
OUTPUT STATE MANAGEMENT TABLE (a)

| DATA ID (702) | LAST OUTPUT TIME (704) | REDUCTION REQUEST STATE (706) |
|---|---|---|
| — | — | — |
| — | — | — |
| — | — | — |

700
OUTPUT STATE MANAGEMENT TABLE (b)

| DATA ID (702) | LAST OUTPUT TIME (704) | REDUCTION REQUEST STATE (706) |
|---|---|---|
| XOS0021A | — | — |
| YOS0031A | — | — |
| XTK0011A | — | — |

700
OUTPUT STATE MANAGEMENT TABLE (c)

| DATA ID (702) | LAST OUTPUT TIME (704) | REDUCTION REQUEST STATE (706) |
|---|---|---|
| XOS0021A | 1234*** | — |
| YOS0031A | 1234*** | — |
| XTK0011A | 1234*** | — |

700
OUTPUT STATE MANAGEMENT TABLE (d)

| DATA ID (702) | LAST OUTPUT TIME (704) | REDUCTION REQUEST STATE (706) |
|---|---|---|
| XOS0021A | 1234*** | IN REQUEST |
| YOS0031A | 1234*** | — |
| XTK0011A | 1234*** | — |

FIG.16
(a)
700 OUTPUT STATE MANAGEMENT TABLE
| DATA ID | LAST OUTPUT TIME | REDUCTION REQUEST STATE | |
|---|---|---|---|
| XOS0021A | 1234*** | ------ |  |
| YOS0031A | 1234*** | — | |
| XTK0011A | 1234*** | — | |
(b)
600 REDUCTION REQUEST HISTORY MANAGEMENT TABLE
| SESSION ID | DATA ID | TERMINAL ID OF REDUCTION REQUEST SOURCE (CAUSE INFORMATION) | |
|---|---|---|---|
| s0001 | XTK0011A | — | |
| s0002 | XTK0012V | — | |
| s0003 | XOS0021A | — |  |
| s0004 | XOS0022V | — | |
| s0005 | YOS0031A | XOS0002 (Network), XTK0003 (CPU) | |
| s0006 | YOS0032V | — | |
| ⋮ | ⋮ | ⋮ | |

# DATA TRANSMISSION SYSTEM, TERMINAL DEVICE, PROGRAM, AND METHOD

FIELD

The present invention relates to a data transmission system, a terminal device, a program, and a method.

BACKGROUND

Conventionally, a teleconference system has been provided as an example of a system for sharing videos and audio among a plurality of bases connected via a communication network. However, in the conventional system, there is a problem in that data output is often delayed, due to deterioration of the communication state of the communication network. When the data output is often delayed, the sound and image are intermitted, and the participants of the conference cannot properly obtain necessary information.

In this regard, Japanese Patent No. 5000141 (Patent Literature 1) discloses a method of preventing audio from being intermitted, by notifying a transmission terminal that a packet delay occurs in a reception terminal, and reducing the amount of data in the transmission packet excluding audio data in the transmission terminal.

However, the data output is delayed not only due to the transmission delay of the communication network, but in many cases, due to the internal processing delay (processing time period from when data is received to when an output signal is generated) at the data receiving side. Thus, the output delay may not be prevented by just focusing on the communication state of the communication network as in Patent Literature 1.

SUMMARY

Technical Problem

The present invention has been made in view of the problem in the conventional technology as described above, and an object of the present invention is to provide a novel data transmission system capable of maintaining a stable output of required information.

Solution to Problem

The present inventors have diligently studied the configuration of the data transmission system capable of maintaining a stable output of required information regardless of the cause of degradation of output quality, found the following configuration, and reached this invention.

According to the present invention, there is provided a data transmission system including a plurality of terminal devices that are connected to a communication network and that transmit or receive content data among the terminal devices. At least one of the terminal devices that receives the content data includes a code amount change requesting unit that, based on an output time interval of an output signal corresponding to predetermined content data, transmits a code amount reduction request to request reduction of a code amount of the predetermined content data while designating a transmission source of the content data as a destination; and a code amount changing unit that, in response to a code amount reduction request transmitted from another terminal device, reduces a code amount of corresponding content data.

Advantageous Effects of Invention

According to the present invention, it is possible to provide a novel data transmission system capable of maintaining a stable output of required information.

BRIEF DESCRIPTION OF DRAWINGS

FIG. 7 is a diagram illustrating a terminal authentication management table according to the present embodiment.

FIG. 8 is a diagram illustrating a terminal management table according to the present embodiment.

FIG. 9 is a diagram illustrating a destination list management table according to the present embodiment.

FIG. 11 is a diagram illustrating a destination list according to the present embodiment.

FIG. 14 is a diagram illustrating reduction request history management tables according to the present embodiment.

FIG. 15 is a diagram illustrating output state management tables according to the present embodiment.

FIG. 16 is a diagram illustrating the output state management table and the reduction request history management table according to the present embodiment.

DESCRIPTION OF EMBODIMENTS

Figure 1:
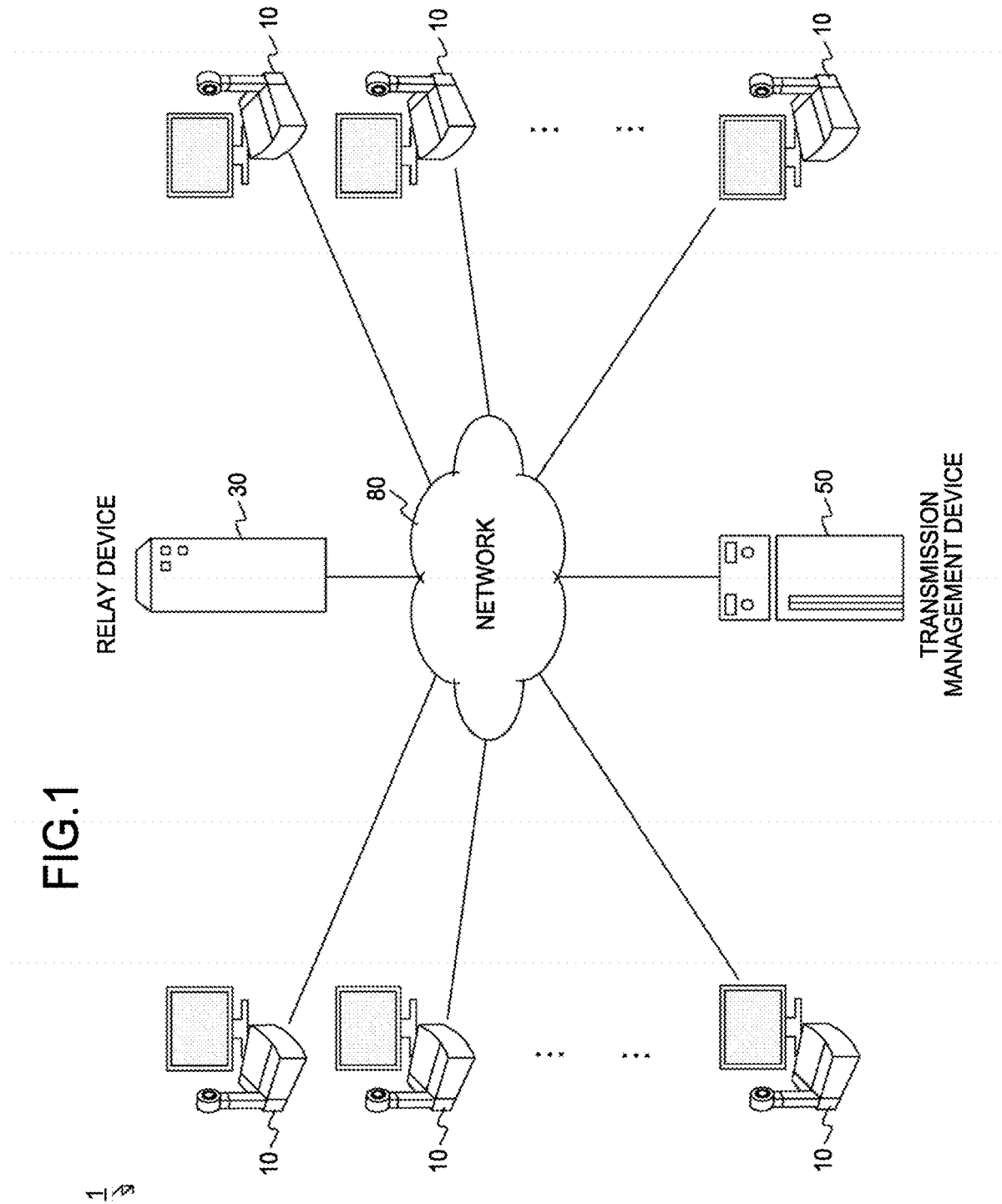
FIG. 1 is a configuration diagram of a communication network in a teleconference system of a present embodiment.

Hereinafter, the present invention will be described with reference to an embodiment. It is to be understood that the present invention is not limited to the following embodiment. In the drawings referred to in the following descriptions, the same reference numerals denote the same components, and the descriptions thereof are suitably omitted.

In the following, a data transmission system of the present invention will be described based on the preferred application of a "teleconference system".

FIG. 1 illustrates a communication network configuration of a teleconference system 1 of an embodiment of the present invention. As illustrated in FIG. 1, the teleconference system 1 of the present embodiment includes a plurality of terminal devices 10 (10a, 10b, 10c . . . ), at least one relay device 30, and a transmission management device 50.

The devices are arranged in a network 80 referred to as an Internet, a local area network (LAN), or the like, and are communicably connected with one another.

Each of the terminal devices 10 is an information processing device that acquires video and audio of the base being installed, and transmits the video and audio to the terminal devices 10 in the other bases. The terminal device 10 also receives video and audio from the terminal devices 10 installed in the other bases, and outputs the video and audio. The relay device 30 is an information processing device that is interposed between the terminal devices 10, and that relays content data. The transmission management device 50 is an information processing device that executes processes (such as login authentication of the terminal device and monitoring communication state of the communication network) required for operating the system and that centrally manages various types of management information.

Figure 2:
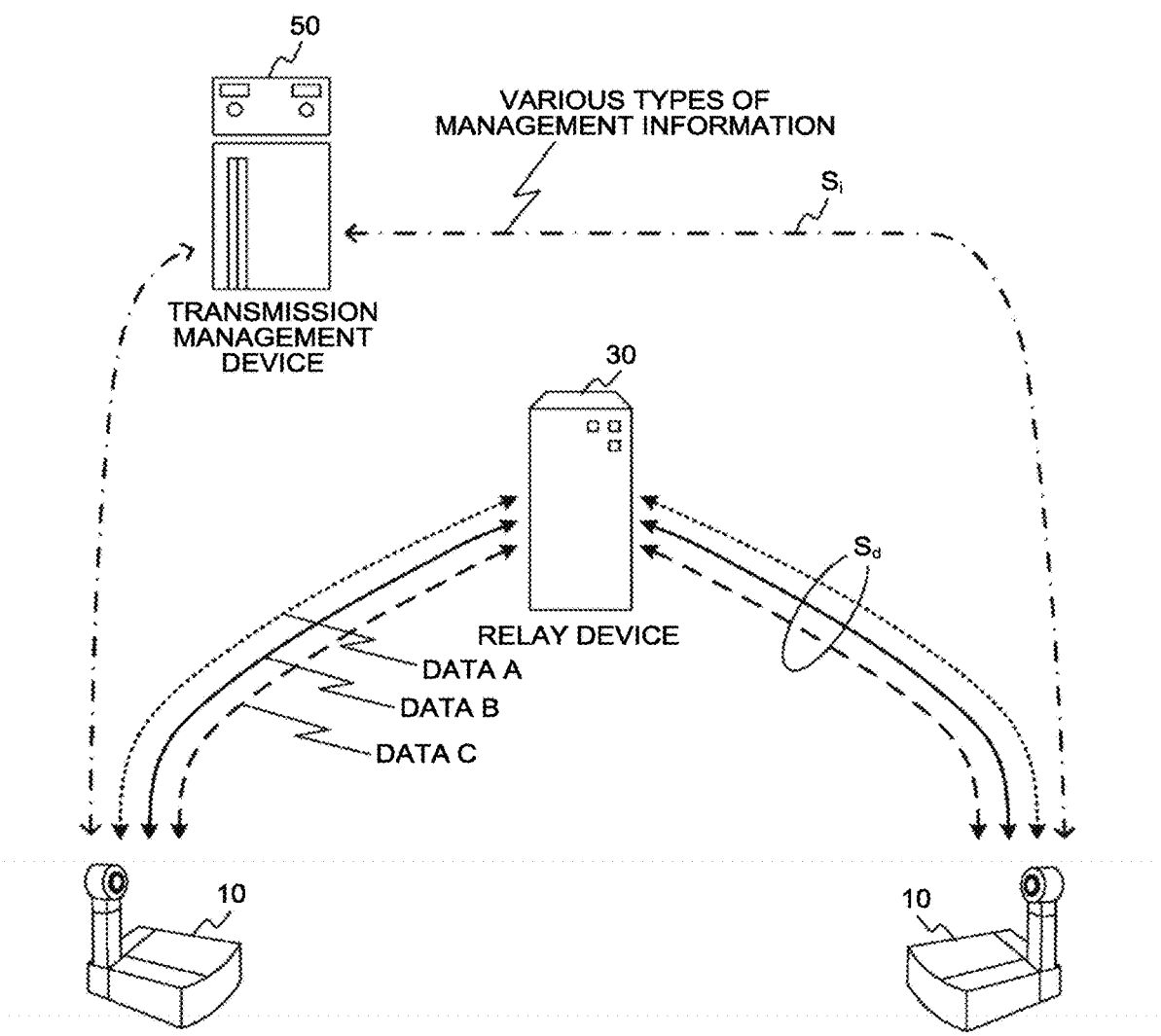
FIG. 2 is a diagram conceptually illustrating an aspect of data transmission in the teleconference system of the present embodiment.

FIG. 2 is a diagram conceptually illustrating an aspect of data transmission in the teleconference system 1 of the present embodiment. In the present embodiment, a specific session $S_i$ for management information is established between each of the terminal devices 10 and the transmission management device 50, to transmit and receive various types of management information. The terminal devices 10 and the transmission management device 50 transmit and receive various types of management information using the session $S_i$. In the present embodiment, a session $S_d$ for data is established between each of the terminal devices 10 and the relay device 30, to transmit and receive content data. The terminal devices 10 and the relay device 30 transmit and receive content data using the session $S_d$.

Each of the terminal devices 10 can transmit a plurality of pieces of content data at the same time. The terminal device 10 also transmits data using the specific session $S_d$ being established separately. For example, the content data may be image data (moving image and still image) and audio data. The content data may also include text data.

The system configuration of the teleconference system 1 of the present embodiment has been briefly described above. Next, the devices that configure the teleconference system 1 will be described.

Figure 3:
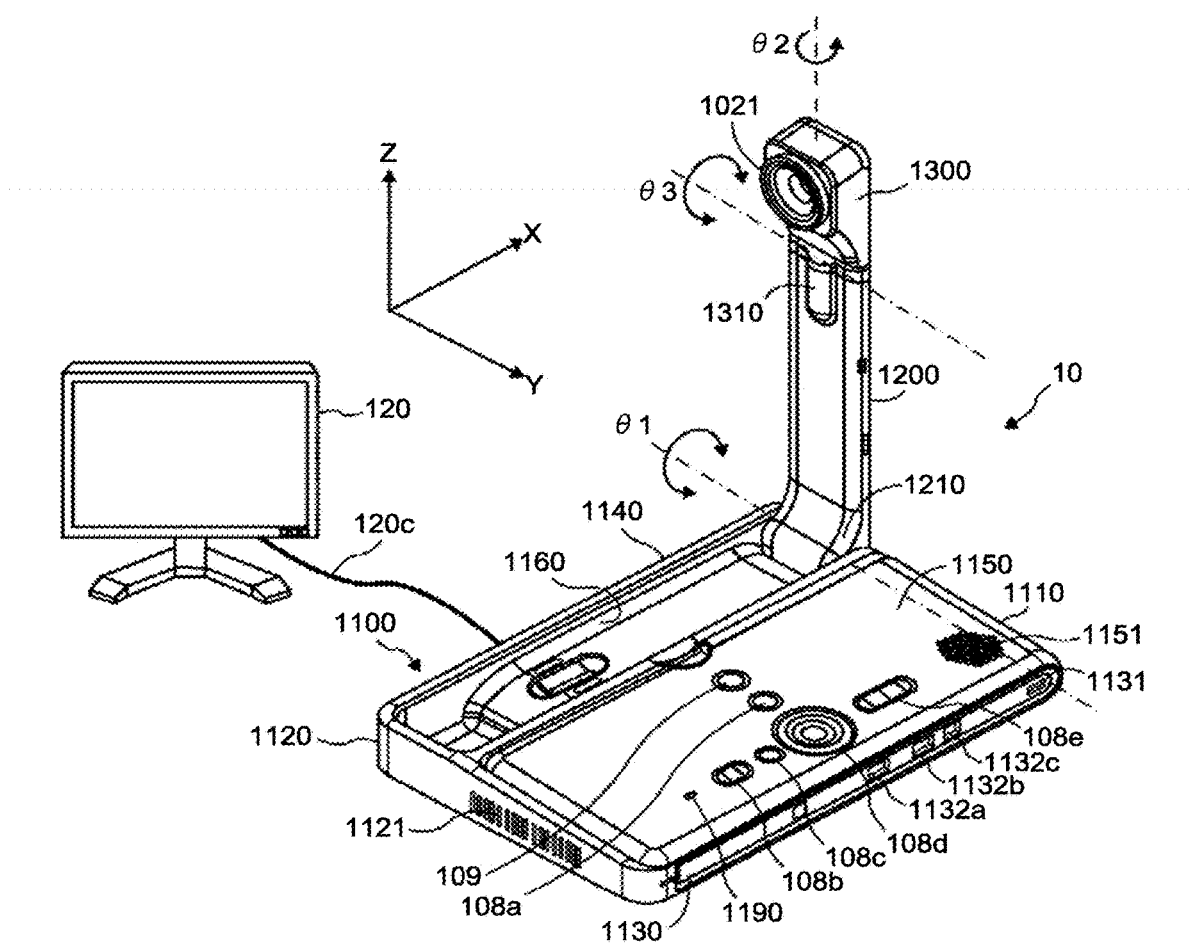
FIG. 3 is an external view of a terminal device of the present embodiment.

First, the configuration of the terminal device 10 of the present embodiment will be described. FIG. 3 is an external view of the terminal device 10 of the present embodiment. It is to be noted that the external view illustrated in FIG. 3 is merely an example. As illustrated in FIG. 3, the terminal device 10 includes a casing 1100, an arm 1200, and a camera housing 1300. An air intake surface (not illustrated) formed of a plurality of air intake holes is provided on a front side wall surface 1110 of the casing 1100. An air discharge surface 1121 formed of a plurality of air discharge holes is provided on a rear side wall surface 1120 of the casing 1100. Thus, the outside air is taken in from the front of the terminal device 10 through the air intake surface (not illustrated), and is discharged to the rear of the terminal device 10 through the air discharge surface 1121, by driving a cooling fan built in the casing 1100. A sound collecting hole 1131 for collecting sound is formed on a right side wall surface 1130 of the casing 1100, and the sound of a conference is collected by a built-in microphone (will be described below), through the sound collecting hole 1131.

An operation panel 1150 is formed at the side of the right side wall surface 1130 of the casing 1100. The operation panel 1150 includes a plurality of operation buttons (108a to 108e), which will be described below, a power source switch 109, which will be described below, and an alarm lamp 1190. The operation panel 1150 also includes a sound output surface 1151 formed of a plurality of sound output holes, through which the output sound from a built-in speaker 115, which will be described below, is passed. An accommodating unit 1160 in a concave shape to accommodate the arm 1200 and the camera housing 1300 is formed at the side of a left side wall surface 1140 of the casing 1100. A plurality of connection ports (1132a to 1132c) each used to electrically connect a cable with an external device connection interface (I/F) 119, which will be described below, are provided on the right side wall surface 1130 of the casing 1100. A connection port (not illustrated) used to connect a cable 120c for a display 120 with the external device connection I/F 119, which will be described below, is provided on the left side wall surface 1140 of the casing 1100.

The arm 1200 is mounted on the casing 1100 via a torque hinge 1210, and the arm 1200 is rotatable in the vertical direction relative to the casing 1100, within a range of a tilt angle θ1 of 135 degrees. FIG. 3 illustrates the state when the tilt angle θ1 is 90 degrees.

A built-in camera (will be described below) is installed in the camera housing 1300, and the built-in camera captures images of the conference. The camera housing 1300 is mounted on the arm 1200 via a torque hinge 1310, and the camera housing 1300 is rotatable in the vertical and horizontal directions relative to the arm 1200, within a range of a pan angle θ2 of ±180 degrees as well as within a range of a tilt angle θ3 of ±45 degrees, when the state illustrated in FIG. 3 is 0 degree.

The external view of the terminal device 10 of the present embodiment has been described above. Next, a hardware configuration of the terminal device 10 will be described.

Figure 4:
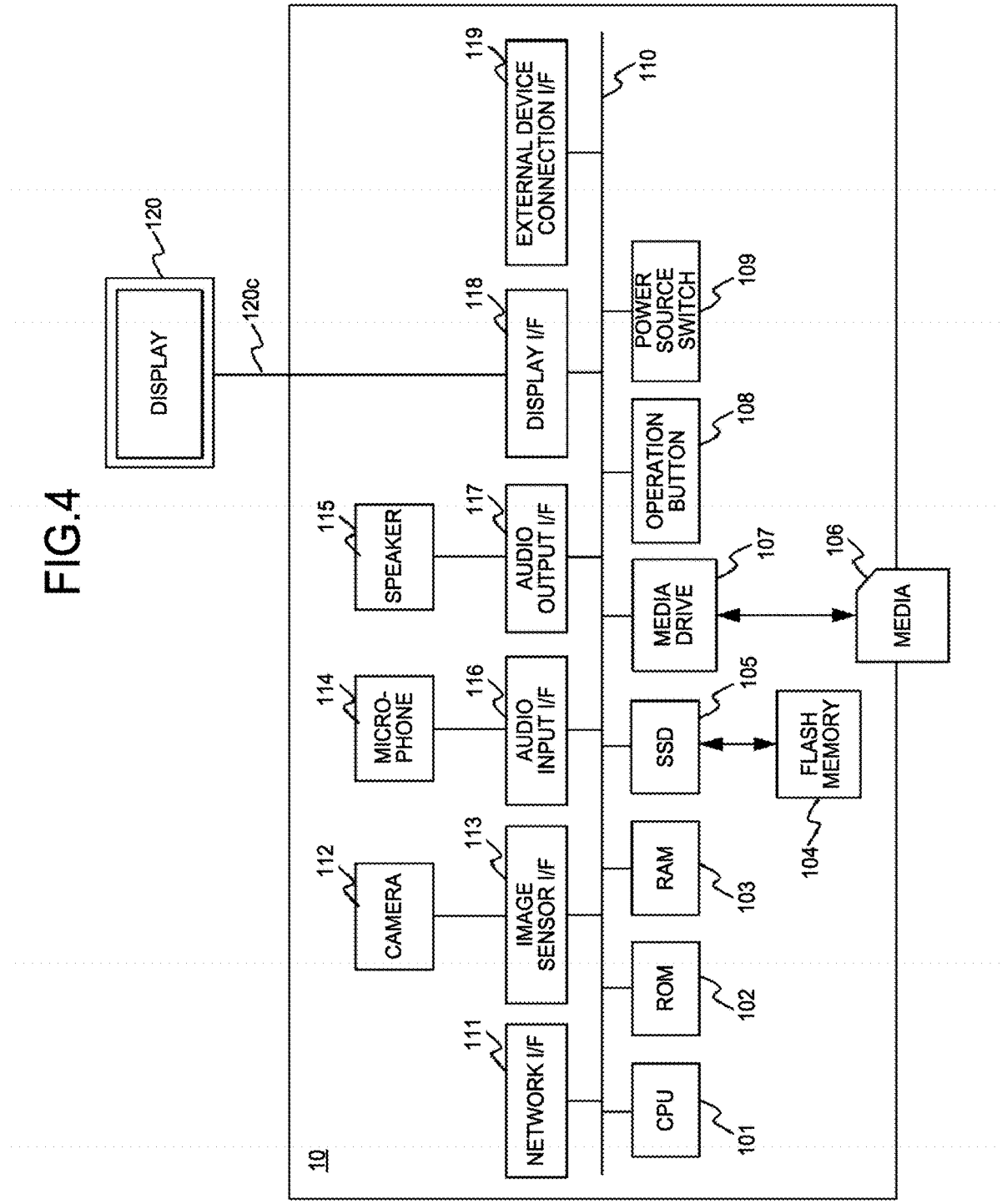
FIG. 4 is a hardware configuration diagram of the terminal device of the present embodiment.

FIG. 4 is a hardware configuration diagram of the terminal device 10 of the present embodiment. As illustrated in FIG. 4, the terminal device 10 includes a central processing unit (CPU) 101 that controls the overall operation of the device, a read-only memory (ROM) 102 that stores therein computer programs such as an initial program loader (IPL) used for driving the CPU 101, a random-access memory (RAM) 103 that is used as a work area of the CPU 101, a flash memory 104 that stores therein various types of data such as a computer program for a terminal, image data, and audio data, and a solid state disk (SSD) 105 that controls reading and writing of various types of data from and to the flash memory 104 according to the control of the CPU 101. The terminal device 10 also includes a media drive 107 that controls reading and writing of data from and to a recording media 106 such as a flash memory, an operation button 108 operated to select a destination of the terminal device 10 and the like, the power source switch 109 that switches ON/OFF the power source of the terminal device 10, a communication network I/F 111 that transmits data using a communication network, and a bus line 110 such as an address bus and a data bus that connects the structural components.

The terminal device 10 also includes a built-in camera 112 including a lens optical system and a solid-state image sensor (such as a complementary metal oxide semiconductor (CMOS) and a charge-coupled device (CCD)) as an image input device for capturing images of the conference and acquiring image data. An image sensor I/F 113 controls driving of the camera 112.

The external display 120 is connected to the terminal device 10 as an image output device. The display 120 displays images of the conference of the other bases, an operation input screen, and the like, based on image signals (such as video graphics array (VGA) signals, high-definition multimedia interface (HDMI) (registered trademark) signals, and digital video interface (DVI) signals) output from a display I/F 118. The display may also be built in.

The terminal device 10 also includes a built-in microphone 114 as an audio input device, and an audio input I/F 116 controls the input of audio signals from the microphone 114. The terminal device 10 further includes the built-in speaker 115 as an audio output device, and the speaker 115 outputs the sound of the conference of the other bases, based on the audio signals output from an audio output I/F 117.

The external device connection I/F 119 for connecting various external devices can connect an external device such as an external camera, an external microphone, and an external speaker via a universal serial bus (USB) cable and the like. In the present embodiment, it may be configured so that the external camera is driven before the built-in camera 112, when the external camera is connected, and the external microphone and the external speaker are driven before the built-in microphone 114 and the built-in speaker 115, when the external microphone and the external speaker are connected. It may also be configured so that the camera, the speaker, and the microphone are only mounted externally.

The hardware configuration of the terminal device 10 of the present embodiment has been described above. Next, hardware configurations of the relay device 30 and the transmission management device 50 according to the present embodiment will be described. The relay device 30 and the transmission management device 50 are both versatile information processing devices referred to as a Web server. Thus, in the following, the hardware configurations of the relay device 30 and the transmission management device 50 will be collectively described.

Figure 5:
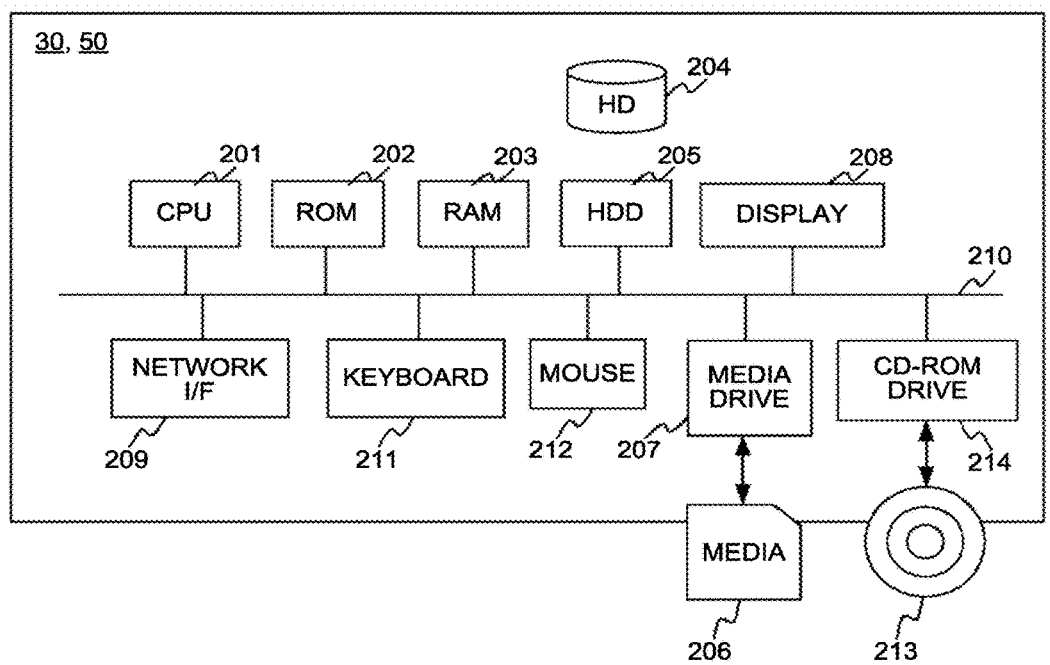
FIG. 5 is a hardware configuration diagram of an information processing device (relay device and transmission management device) of the present embodiment.

FIG. 5 is a hardware configuration diagram of the information processing device (relay device 30 and transmission management device 50) of the present embodiment. As illustrated in FIG. 5, the information processing devices 30 and 50 of the present embodiment each includes a CPU 201 that controls the overall operation of the device, a ROM 202 that stores therein computer programs such as the IPL used for driving the CPU 201, a RAM 203 that is used as a work area of the CPU 201, a hard disk (HD) 204 that stores therein various types of data (such as a data relaying program and a transmission management program), and a hard disk drive (HDD) 205 that controls reading and writing of various types of data from and to the HD 204 according to the control of the CPU 201. Also, the information processing devices 30 and 50 each includes a media drive 207 that controls reading and writing of data from and to a recording media 206 such as a flash memory, a display 208 that displays various types of information, a communication network I/F 209 that transmits data via a communication network such as LAN and Internet, a keyboard 211 and a mouse 212 as an input device, a compact disc-read only memory (CD-ROM) drive 214 that controls reading and writing of various types of data from and to a CD-ROM 213, and a bus line 210 such as an address bus and a data bus that connects the structural components described above.

The hardware configurations of the terminal device 10, the relay device 30, and the transmission management device 50 of the present embodiment have been described above. Next, functional blocks of the transmission management device 50 will be described.

Figure 6:
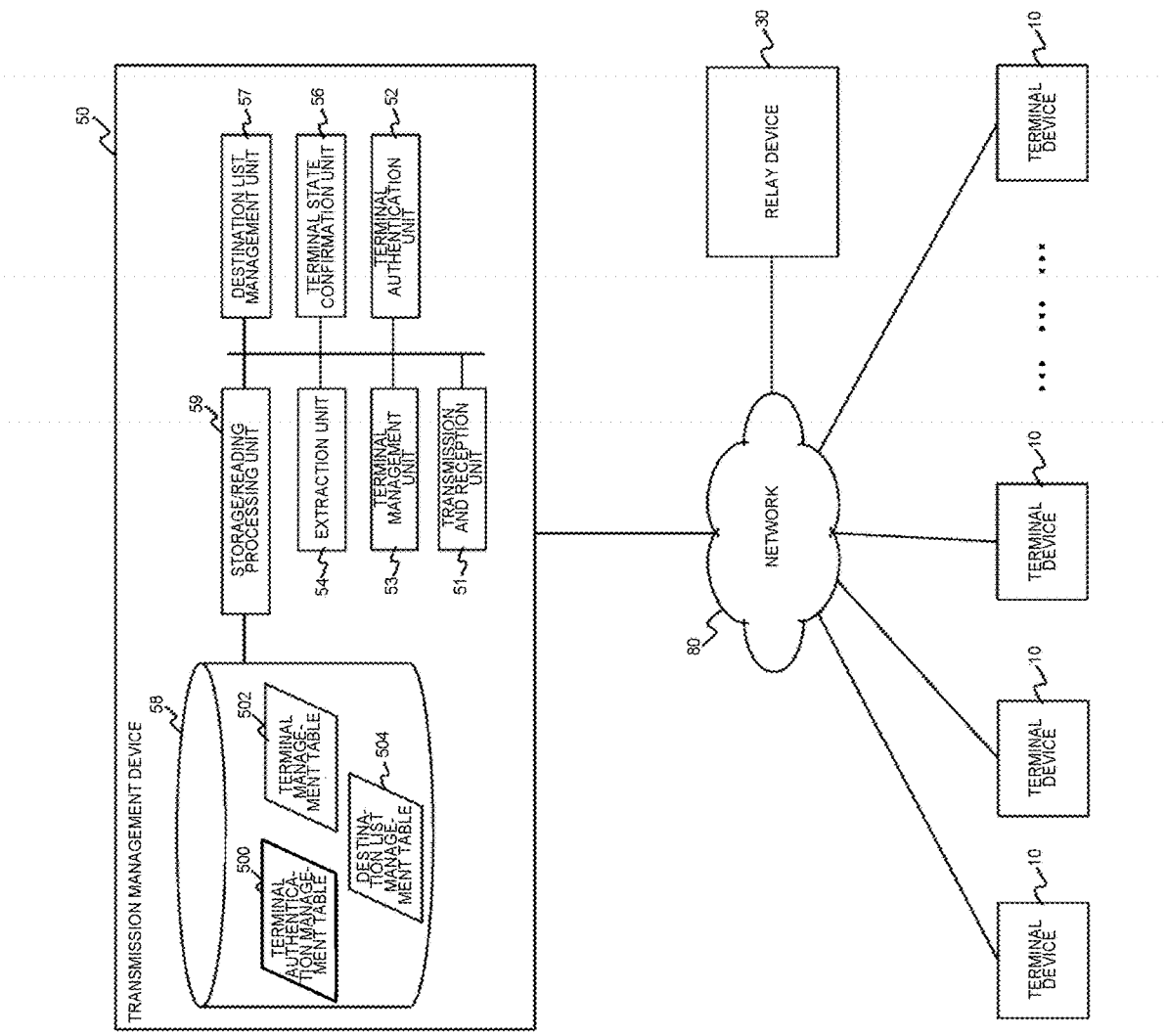
FIG. 6 is a function block diagram of the transmission management device of the present embodiment.

FIG. 6 illustrates function blocks of the transmission management device 50 of the present embodiment. As illustrated in FIG. 6, the transmission management device 50 of the present embodiment includes a transmission and reception unit 51, a terminal authentication unit 52, a terminal management unit 53, an extraction unit 54, a terminal state confirmation unit 56, a destination list management unit 57, a storage/reading processing unit 59, and a storage device 58.

The transmission and reception unit 51 transmits and receives various types of data with the terminal device 10 and the relay device 30 via the network 80. The terminal authentication unit 52 searches a terminal authentication management table 500 (see FIG. 7) stored in the storage device 58, using the terminal ID and the password included in login request information received via the transmission and reception unit 51 as search keys. The terminal authentication unit 52 then determines whether the same pair of the terminal ID and the password are managed in the terminal authentication management table 500 to thereby perform terminal authentication.

To manage the operation state of a request source terminal that has requested a login, the terminal management unit 53 stores and manages the terminal ID of the request source terminal, the operation state of the request source terminal, the reception date and time when the login request information is received by the transmission management device 50, and the IP address of the request source terminal in a terminal management table 502 (see FIG. 8) in an associated manner. When the user turns OFF the power source switch 109 (see FIG. 3) of the terminal device 10 from ON state, the terminal management unit 53 changes the operation state in the terminal management table 502 from online to offline, based on the operation state information indicating turning OFF of the power source, sent from the terminal device 10.

The extraction unit 54 searches a destination list management table 504 illustrated in FIG. 9, using the terminal ID of the request source terminal that has requested a login, as a key, and extracts the terminal ID of the candidate destination terminal that is communicable with the request source terminal, by reading out the terminal ID. In this example, the destination list management table 504 is a table generated based on a mutual authentication process executed in advance between the terminal devices 10 that each has an account in the teleconference system 1. The destination list management table 504 manages the terminal ID of the transmission source terminal device 10 and the terminal ID of the destination terminal device 10 that has received an approval from the transmission source terminal device 10, in an associated manner.

The extraction unit 54 also searches the destination list management table 504 using the terminal ID of the request source terminal that has requested a login, as a key, and extracts the terminal ID of the other request source terminal having registered the terminal ID of the request source terminal described above as a candidate destination terminal. The extraction unit 54 also searches the terminal management table 502 using the terminal ID of the candidate destination terminal extracted by the extraction unit 54, as a key, and reads out the operation state of the terminal for each terminal ID extracted by the extraction unit 54. Thus, the extraction unit 54 can acquire the operation state of the candidate destination terminal communicable with the request source terminal that has requested a login. The extraction unit 54 also searches the terminal management table 502 using the terminal ID extracted by the extraction unit 54 as a search key, and extracts the operation state of the request source terminal that has requested a login.

The terminal state confirmation unit 56 confirms the corresponding operation state, by searching the terminal management table 502 using the terminal ID or the destination name as a search key.

The destination list management unit 57 adds or deletes the terminal ID of the destination terminal, for each terminal ID of the request source terminals in the destination list management table 504.

The storage/reading processing unit 59 stores various types of data in the storage device 58, and reads out various types of data stored in the storage device 58.

Figure 10:
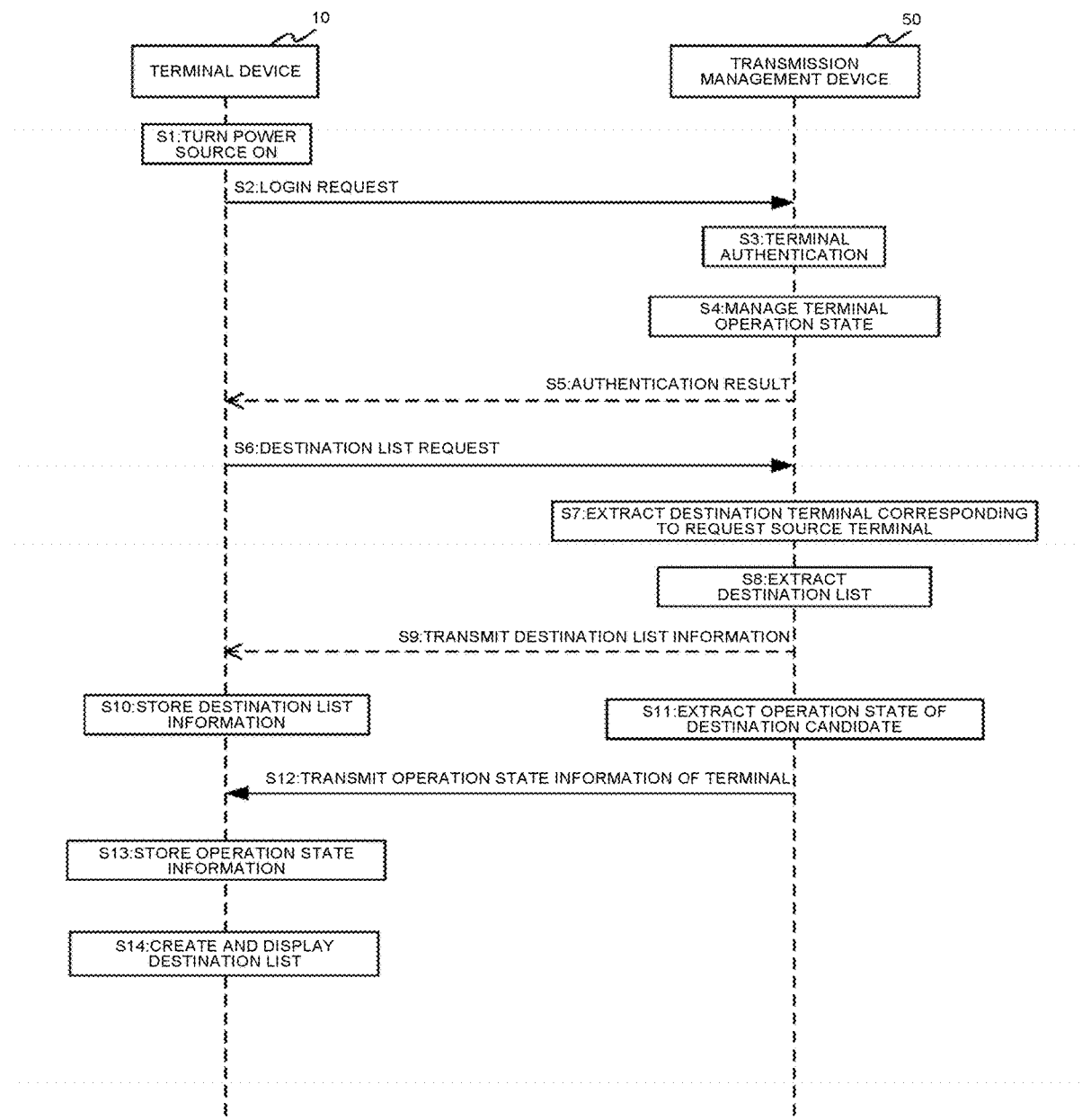
FIG. 10 is a sequence diagram illustrating a mutual authentication process performed in the present embodiment.

The functional blocks of the transmission management device 50 have been described above. Next, a process executed when the terminal device 10 logs into the teleconference system 1 and participates in the conference will now be described based on the sequence diagram illustrated in FIG. 10.

The user first turns ON the power source switch 109 (see FIG. 3) (step S1). In response to this, the terminal device 10 issues a login request including the terminal ID and the password, to the transmission management device 50 (step S2).

The terminal authentication unit 52 of the transmission management device 50 searches the terminal authentication management table 500 (see FIG. 7) of the storage device 58, using the terminal ID and the password included in the login request received via the transmission and reception unit 51, as search keys. The terminal authentication unit 52 then performs terminal authentication by determining whether the same terminal ID and the same password are managed in the terminal authentication management table 500 (step S3). When the authentication is successful, the terminal management unit 53 stores the operation state, the reception date and time when the login request is received, and the IP address of the terminal device 10 in the terminal management table 502 (see FIG. 9) in an associated manner, for each record indicated by the terminal ID and the destination name of the terminal device 10 of the login request source (step S4). Then, the terminal authentication unit 52 transmits the authentication result (authentication successful) to the terminal device 10 of the login request source via the transmission and reception unit 51 (step S5).

Upon receiving the authentication result (authentication successful), the terminal device 10 issues a destination list request to the transmission management device 50 (step S6). Consequently, the extraction unit 54 of the transmission management device 50 searches the destination list management table 504 (see FIG. 9), using the terminal ID of the terminal device 10 of the destination list request source as a search key, and extracts the terminal ID of the candidate destination terminal communicable with the terminal device 10 of the destination list request source, and reads out the destination name corresponding to the terminal ID, from the terminal management table 502 (see FIG. 8) (step S7).

Next, the storage/reading processing unit 59 of the transmission management device 50 reads out data in a destination list frame from the storage device 58 (step S8). The storage/reading processing unit 59 then transmits "destination list information (destination list frame, terminal ID, and destination name) including the destination list frame as well as the terminal ID and the destination name extracted by the extraction unit 54, to the terminal device 10 of the destination list request source (step S9). Consequently, the terminal device 10 of the request source stores the received destination list information in a management information storage unit (step S10).

Furthermore, the extraction unit 54 of the transmission management device 50 searches the terminal management table 502 (see FIG. 8) using the terminal ID of the candidate destination terminal that has been previously extracted as a search key, and reads out the corresponding operation state of the candidate destination terminal for each terminal ID (step S11).

Next, the transmission and reception unit 51 of the transmission management device 50 transmits "terminal operation state information" including the terminal ID used as a search key at S7 described above, and the operation state of the corresponding destination terminal, to the terminal device 10 of the request source (step S12).

Consequently, the terminal device 10 of the request source stores the received "terminal operation state information" in the management information storage unit (step S13). In this manner, the terminal device 10 of the request source can acquire the operation state of the communicable candidate destination terminal, at the current point.

Next, the terminal device 10 of the request source creates and displays the destination list that has reflected the state of the terminal device 10 as the destination candidate, based on the destination list information and the operation state information of the terminal, stored in the management information storage unit step S14) FIG. 11 exemplarily illustrates the destination list displayed on the display 120 connected to the terminal device 10.

FIG. 11 exemplarily illustrates the destination list displayed on the display 120 connected to the terminal device 10.

The process executed when the terminal device 10 logs into the teleconference system 1 has been described above. In the present embodiment, in response to the user selecting a desired terminal device 10 from the destination list (see FIG. 11) that is displayed, the transmission and reception of content data between the selected terminal device 10 and the terminal device 10 of the user will be in a standby mode. When the terminal device 10 selected by the user has already been in conference with the other terminal device 10, the transmission and reception of content data between (the terminal device 10 of) the user and all the terminal devices 10 that are participating in the conference will be in a standby mode.

The process executed when the terminal device 10 logs into the teleconference system 1 and participates in the conference has been described above. Next, functional blocks of the terminal device 10 and the relay device 30 of the present embodiment will be described.

Figure 12:
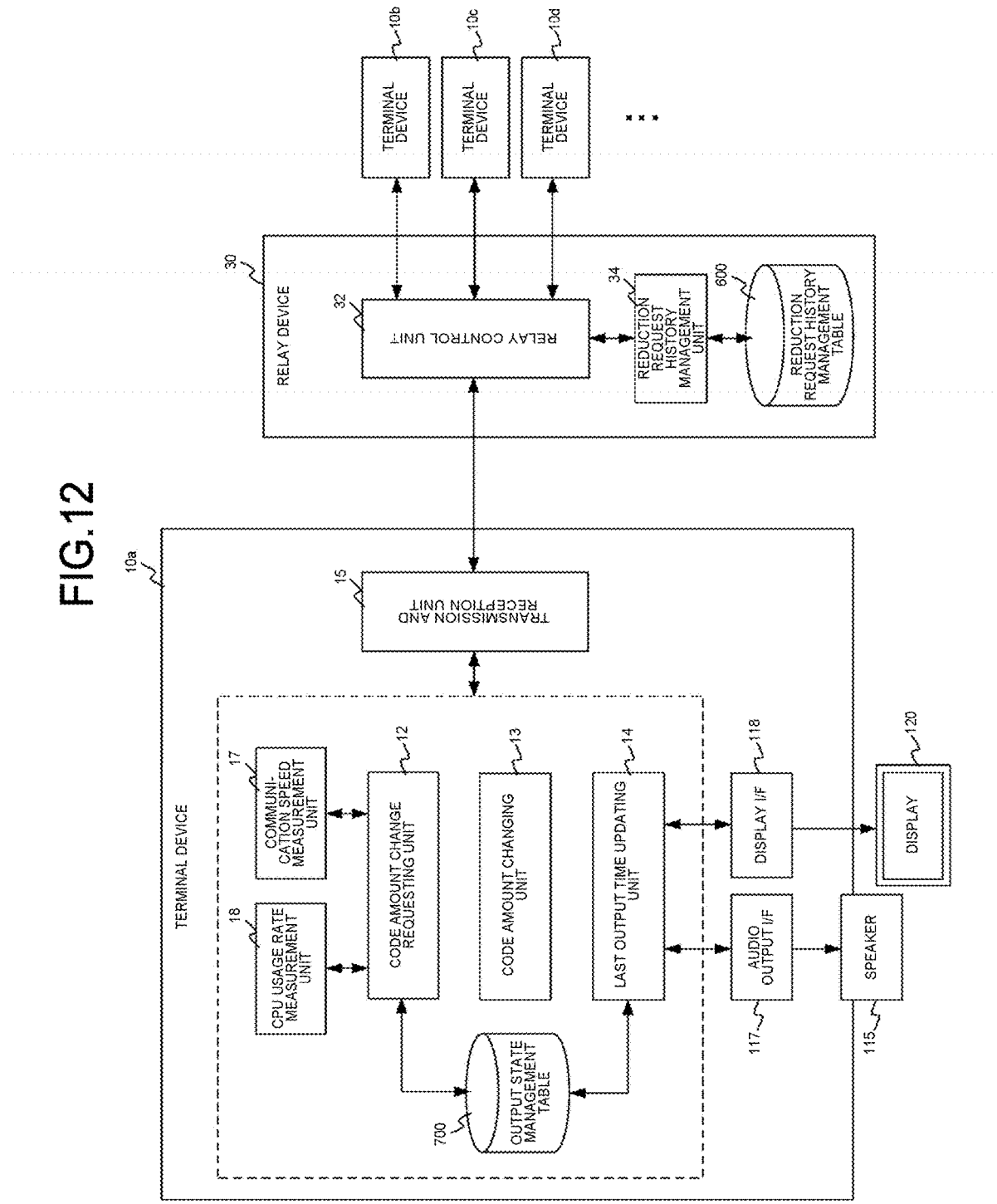
FIG. 12 is a functional block diagram of the terminal device and the relay device of the present embodiment.

FIG. 12 illustrates functional blocks of the terminal device 10 and the relay device 30 of the present embodiment. As illustrated in FIG. 12, the terminal device 10 of the present embodiment includes a code amount change requesting unit 12, a code amount changing unit 13, a last output time updating unit 14, and a transmission and reception unit 15.

The code amount change requesting unit 12 is a functional unit to transmit a request for reducing the code amount of predetermined content data (hereinafter, referred to as a code amount reduction request) selected by the user, to the transmission source of the content data, in response to detecting the output delay of the content data. The code amount changing unit 13 is a functional unit to execute a process of reducing the code amount of the transmission data, in response to the code amount reduction request transmitted from the other terminal device 10.

The last output time updating unit 14 is a functional unit to update the last output time (will be described below) of the predetermined content data selected by the user. The transmission and reception unit 15 is a functional unit to transmit and receive various types of data with the other terminal device 10 via the relay device 30.

The relay device 30 of the present embodiment includes a relay control unit 32 and a reduction request history management unit 34.

The relay control unit 32 is a functional unit to transfer the various types of data received from the terminal device 10 to the designated destination. The reduction request history management unit 34 is a functional unit to manage the history of the code amount reduction request received from the terminal device 10.

The functional blocks of the terminal device 10 and the relay device 30 have been briefly described above. Next, the contents of a specific process executed by the functional units illustrated in FIG. 12 will be described based on the sequence diagram illustrated in FIG. 13. In the following explanation, reference will be made to FIG. 12 as needed.

The user participates in a conference by selecting a desired destination from the destination list (see FIG. 11) displayed on the display 120 of the terminal device 10a. At this time, a user interface (UI) control unit (not illustrated) of the terminal device 10a displays an input screen for receiving the registration and cancellation of the content data the user wishes to transmit on the display 120.

When the user selects the content data the user wishes to transmit via the input screen, the UI control unit (not illustrated) transmits a registration request of the selected content data to the relay device 30 (step S21).

Consequently, the relay device 30 assigns a data ID that is unique in the conference in which the terminal device 10 is currently participating, to each content data the registration of which is requested by the terminal device 10a. The relay device 30 also generates content data registration information that is a list of data names and data IDs of the content data registered by all the terminal devices 10 (including the terminal device 10a) that are participating in the conference (step S22). The relay device 30 then transmits the content data registration information to the terminal device 10a (step S23).

At the same time, the relay device 30 generates a reduction request history management table 600 (updates the content if the reduction request history management table 600 has already been generated) illustrated in (a) of FIG. 14 (step S24). As illustrated in (a) of FIG. 14, the reduction request history management table 600 includes a field 602 for storing a session ID, a field 604 for storing a data ID, and a field 606 for storing the terminal ID of the terminal device 10 having been the transmission source of the code amount reduction request corresponding to the content data, relative to the content data relayed by the relay device 30. The reduction request history management table 600 manages the values of the fields in an associated manner.

The code amount change requesting unit 12 of the terminal device 10a generates an output state management table 700 illustrated in (a) of FIG. 15, in response to the UI control unit (not illustrated) receiving the content data registration information from the relay device 30 (step S25). As illustrated in (a) of FIG. 15, the output state management table 700 includes a field 702 for storing a data ID, a field 704 for storing the last output time, and a field 706 for storing the state corresponding to the code amount reduction request, relative to the content data received from the other terminal devices 10 (10b, 10c, 10d . . . ).

Subsequently, the UI control unit (not illustrated) of the terminal device 10a generates a selection screen including a list of content data to be received by the terminal device 10a in the conference, based on the content data registration information received from the relay device 30. The UI control unit then displays the selection screen on the display 120 (step S26). The user then selects at least one of the content data the user wishes to output without delay, via the input screen. More specifically, the user who regards the comments of the participants in the conference most important may select the audio data of each base, from a plurality of pieces of content data to be received.

In response to receiving an input selected by the user via the UI control unit (not illustrated), the code amount change requesting unit 12 sets the data ID of the selected content data, in the field 702 of the output state management table 700 (step S27). (b) of FIG. 15 illustrates the output state management table 700 in which the data ID is being set.

At the point when the procedure described above has finished, the terminal device 10a transmits the content data thereof to the relay device 30 while designating the other terminal device 10 (10b, 10c, 10d . . . ) as the destination. The terminal device 10a also receives, from the relay device 30, content data of the other terminal device 10 (10b, 10c, 10d . . . ) for which the terminal device 10a itself is designated as the destination. At this time, the data ID is stored in the packet of the content data to be transmitted and received via the relay device 30.

During the conference in progress in this manner, if the time period from when the other terminal device 10 (10b, 10c, 10d . . . ) transmits content data to when the terminal device 10a outputs an output signal corresponding to the data to the output device of the terminal device 10a exceeds the allowable range to become longer, the user of the terminal device 10a senses a delay in image and audio, and the user will have difficulty in recognizing the content correctly.

In regard to this point, in the present embodiment, before the output delay of the content data (image and audio) selected by the user in advance reaches the level sensed by the user, corrective measures are taken to solve the output delay.

In regard to this point, a process executed by the last output time updating unit 14 of the terminal device 10a will be described first. The output delay of content data is caused by the "transmission delay" resulting from the communication state of the communication network and the "internal processing delay" resulting from the processing time period from when data is received to when an output signal is generated. Regardless of the cause, a sign of output delay appears as an increase in the time interval of outputting output signals. In regard to this point, the last output time updating unit 14 stores the system time (hereinafter, referred to as last output time) that is the time when the output signal corresponding to the received content data is last output to the output device, in the field 704 of the output state management table 700. The last output time updating unit 14 updates the value every time a new output signal is output.

More specifically, the last output time updating unit 14 stores the last output time that is the time when the audio output I/F 117 (see FIG. 4) has output an audio signal generated based on the audio data transmitted from the other terminal device 10, to the speaker 115 (see FIG. 4), in the field 704 corresponding to the audio data. The last output time updating unit 14 updates the value every time a new audio signal is output. The last output time updating unit 14 also stores the last output time that is the time when the display I/F 118 has output an image signal generated based on the image data transmitted from the other terminal device 10, to the display 120 (see FIG. 4), in the field 704 corresponding to the image data. The last output time updating unit 14 updates the value every time a new output signal is output. The last output time updating unit 14 may also update the time (time stamp) when drawing data (data obtained by decoding image data received from the transmission source via a network) is delivered to a drawing module, as the last output time.

(c) of FIG. 15 illustrates the output state management table 700 after the terminal device 10a has started receiving content data. When the terminal device 10a starts receiving data, as illustrated in (c) of FIG. 15, the latest last output time is set in the field 704 corresponding to the data ID of each data.

The description will continue by returning to FIG. 13. The code amount change requesting unit 12 continues to monitor the field 704 in the output state management table 700 that is updated by the last output time updating unit 14. As a result, the code amount change requesting unit 12 generates a code amount reduction request of the selected content data, in response to detecting the output delay of the content data, using the following procedure.

First, upon detecting the output delay of the selected content data, the code amount change requesting unit 12 determines whether the network communication speed measured by a communication speed measurement unit 17 exceeds a predetermined threshold. If the measured value is below the predetermined threshold, the code amount change requesting unit 12 estimates that the cause of the output delay is the "transmission delay". In addition, the code amount change requesting unit 12 determines whether the CPU usage rate measured by a CPU usage rate measurement unit 18 exceeds a predetermined threshold. If the measured value exceeds the predetermined threshold, the code amount change requesting unit 12 estimates that the cause of the output delay is the "internal processing delay". The code amount change requesting unit 12 then generates a code amount reduction request including the data ID of the content data the output delay of which is detected, the terminal ID of the terminal device 10a, and the estimated cause (at least one of the "transmission delay" and the "internal processing delay").

Then, the code amount change requesting unit 12 transmits the generated code amount reduction request to the relay device 30 (step S28) while designating the other terminal device 10, which is the transmission source of the content data, as the destination. Consequently, the output state management table 700 is updated (step S29). The reduction request history management unit 34 of the relay device 30 then updates the reduction request history management table 600, when the relay control unit 32 has received the code amount reduction request from the terminal device 10a (step S30).

In this example, it is assumed that the code amount change requesting unit 12 of the terminal device 10a transmits a code amount reduction request including a data ID "XOS0021A", a terminal ID "XTK0001" of the terminal device 10a, and the estimated cause ("Network" indicating the transmission delay) to the relay device 30. In this case, in the output state management table 700, as illustrated in (d) of FIG. 15, the field 706 corresponding to the data ID "XOS0021A" is updated to "in request". In the reduction request history management table 600, as illustrated in (b) of FIG. 14, the terminal ID "XT0001" of the terminal device 10a serving as the transmission source of the code amount reduction request, and the estimated cause ("Network" indicating the transmission delay) are stored in the field 606 corresponding to the data ID "XOS0021A" included in the code amount reduction request. In other words, in the present embodiment, the request history (which terminal device 10 has transmitted the code amount reduction request of each content data based on what cause) of each content data is held in the field 606 of the reduction request history management table 600.

After the reduction request history management unit 34 of the relay device 30 has updated the reduction request history management table 600, the relay control unit 32 transfers the code amount reduction request received from the terminal device 10a to the other terminal device 10 serving as the transmission source of the content data corresponding to the data ID "XOS0021A" (step S31).

The code amount changing unit 13 of the other terminal device 10 that has received the code amount reduction request from the relay control unit 32 of the relay device 30 retrieves the data ID and the estimated cause from the code amount reduction request, and executes a process of reducing the code amount of the content data corresponding to the data ID according to the estimated cause (step S32).

More specifically, if the estimated cause is the "transmission delay", the code amount changing unit 13 executes a process of increasing the compression rate of the target content data (in other words, a process of reducing the bit rate). If the estimated cause is the "internal processing delay", the code amount changing unit 13 executes a process of reducing the sampling rate for the audio data, and a process of reducing the resolution for the image data. If the estimated cause includes both the "transmission delay" and the "internal processing delay", the code amount changing unit 13 executes a process of increasing the compression rate as well as reducing the sampling rate for the audio data, and executes a process of increasing the compression rate as well as reducing the resolution for the image data. If the reduction request history management table 600 is updated as illustrated in (b) of FIG. 14, the code amount changing unit 13 of the other terminal device 10 serving as the transmission source of the content data corresponding to the data ID "XOS0021A", retrieves the data ID "XOS0021A" and the estimated cause "Network" from the received code amount reduction request, and executes a process of increasing the compression rate (process of reducing the bit rate) for the audio data corresponding to the data ID "XOS0021A".

As a result of executing the series of processes (steps S28 to S32) described above, the terminal device 10a can reliably receive the audio data (data ID "XOS0021A") of the other terminal device 10 without being intermitted.

Then, the code amount change requesting unit 12 of the terminal device 10a continues to monitor the field 704 of the output state management table 700. As a result, in response to sufficiently solving the output delay of the content data the code amount of which is being requested to be reduced, the code amount change requesting unit 12 generates a notification to withdraw the code amount reduction request corresponding to the content data (hereinafter, referred to as a code amount reduction request withdrawal notification) using the following procedure.

First, upon detecting that the output delay of the content data the code amount of which is being requested to be reduced has been sufficiently solved, the code amount change requesting unit 12 generates a code amount reduction request withdrawal notification including the data ID of the content data and the terminal ID of the terminal device 10a.

The code amount change requesting unit 12 then transmits the generated code amount reduction request withdrawal notification to the relay device 30 while designating the transmission source of the content data as the destination (step S33). Consequently, the output state management table 700 is updated (step S34). Meanwhile, the reduction request history management unit 34 of the relay device 30 updates the reduction request history management table 600, when the relay control unit 32 has received the code amount reduction request withdrawal notification from the terminal device 10a (step S25)

In this example, it is assumed that the code amount change requesting unit 12 of the terminal device 10a transmits the code amount reduction request withdrawal notification including the data ID "XOS0021A" and the terminal ID "XTK0001" of the terminal device 10a, to the relay device 30. In this case, in the output state management table 700, as illustrated in (a) of FIG. 16, "in request" stored in the field 706 corresponding to the data ID "XOS0021A" is deleted. Meanwhile, in the reduction request history management table 600, as illustrated in (b) of FIG. 16, the request history "XTK0001 (Network)" is deleted from the field 606 corresponding to the data ID "XOS0021A" included in the code amount reduction request.

In this example, after deleting the request history "XTK0001 (Network)" from the field 606 corresponding to the data ID "XOS0021A" included in the code amount reduction request, the reduction request history management unit 34 of the relay device 30 determines whether all the request history corresponding to the data ID "XOS0021A" have been deleted. As a result, if all the request history corresponding to the data ID "XOS0021A" have been deleted, the reduction request history management unit 34 transfers the code amount reduction request withdrawal notification with respect to the data ID "XOS0021A" received from the terminal device 10a, to the other terminal device 10 having been designated as the destination (step S36).

Meanwhile, as illustrated in (b) of FIG. 16, for one piece of content data (data ID "YOS0031A"), if there is request history transmitted from two or more terminal devices 10 (terminal IDs="XOS0002" and "XTK0003") and a part of the request history is deleted, the code amount reduction request withdrawal notification with respect to the content data will not be transferred to the other terminal device 10 that is the transmission source of the content data as long as all the request history are not deleted (in other words, as long as all the code amount reduction requests with respect to the content data are not withdrawn).

The code amount changing unit 13 of the other terminal device 10 that has received the code amount reduction request withdrawal notification from the relay device 30, retrieves the data ID from the code amount reduction request withdrawal notification, and performs a process of recovering the code amount of the content data corresponding to the data ID, to the standard state before the code amount has been reduced (step S37). More specifically, the code amount changing unit 13 recovers the parameter that has been changed to reduce the code amount to the original value, among the compression rate, the sampling rate (audio data), and the resolution (image data) of the target content data.

As a result of executing the series of processes (steps S33 to S37) described above, the terminal device 10a can receive the audio data (data ID "XOS0021A") of the other terminal device 10 in original standard quality, as soon as the cause of the output delay has been solved.

Figure 13:
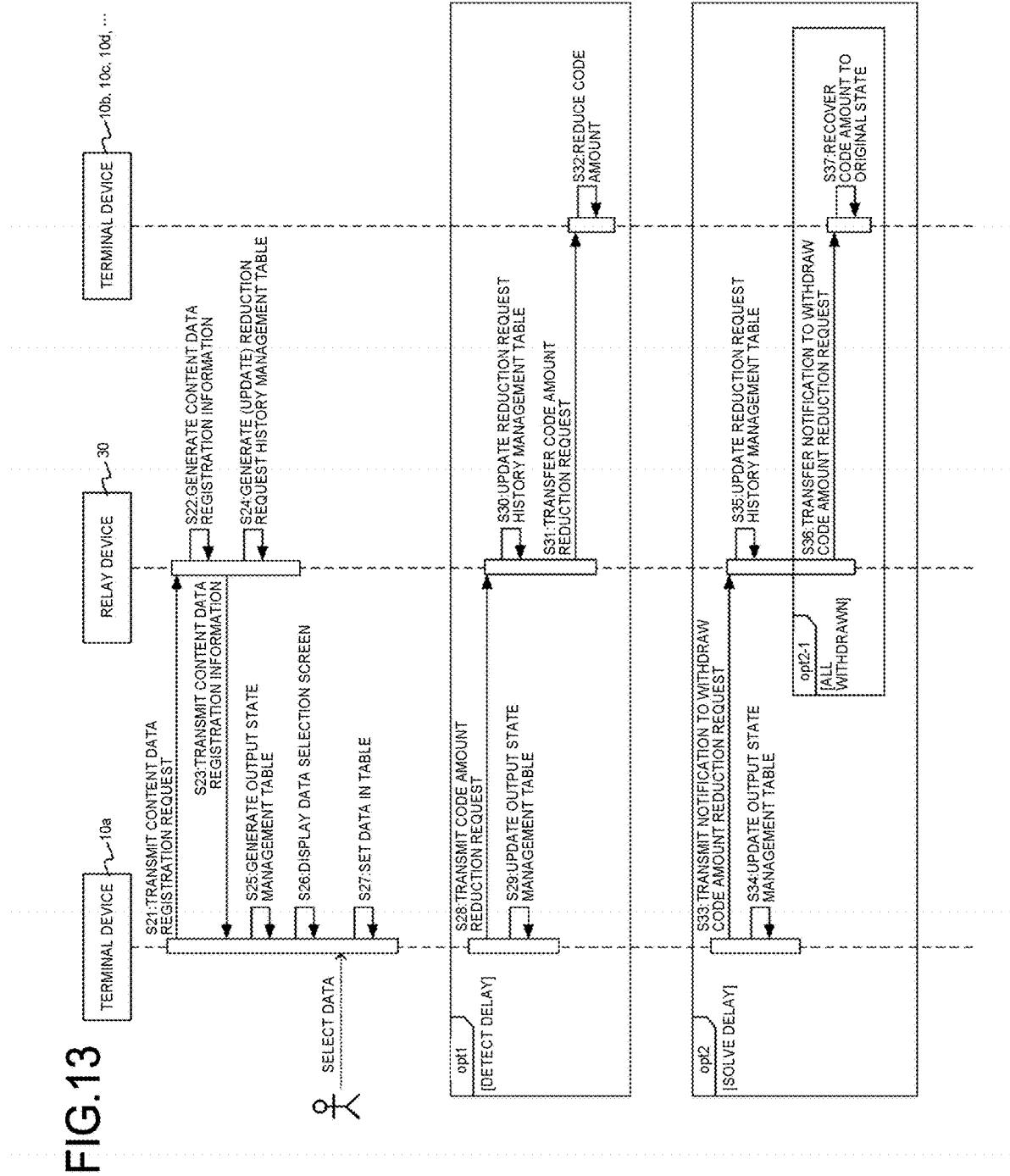
FIG. 13 is a sequence diagram illustrating a process executed in a teleconference system 1 of the present embodiment.

The contents of the processes cooperatively executed by the functional units illustrated in FIG. 12 have been described above based on the sequence diagram illustrated in FIG. 13. Next, the transmission processes of the code amount reduction request and the code amount reduction request withdrawal notification executed by the code amount change requesting unit 12 will be described in detail based on the flowchart illustrated in FIG. 17.

Figure 17:
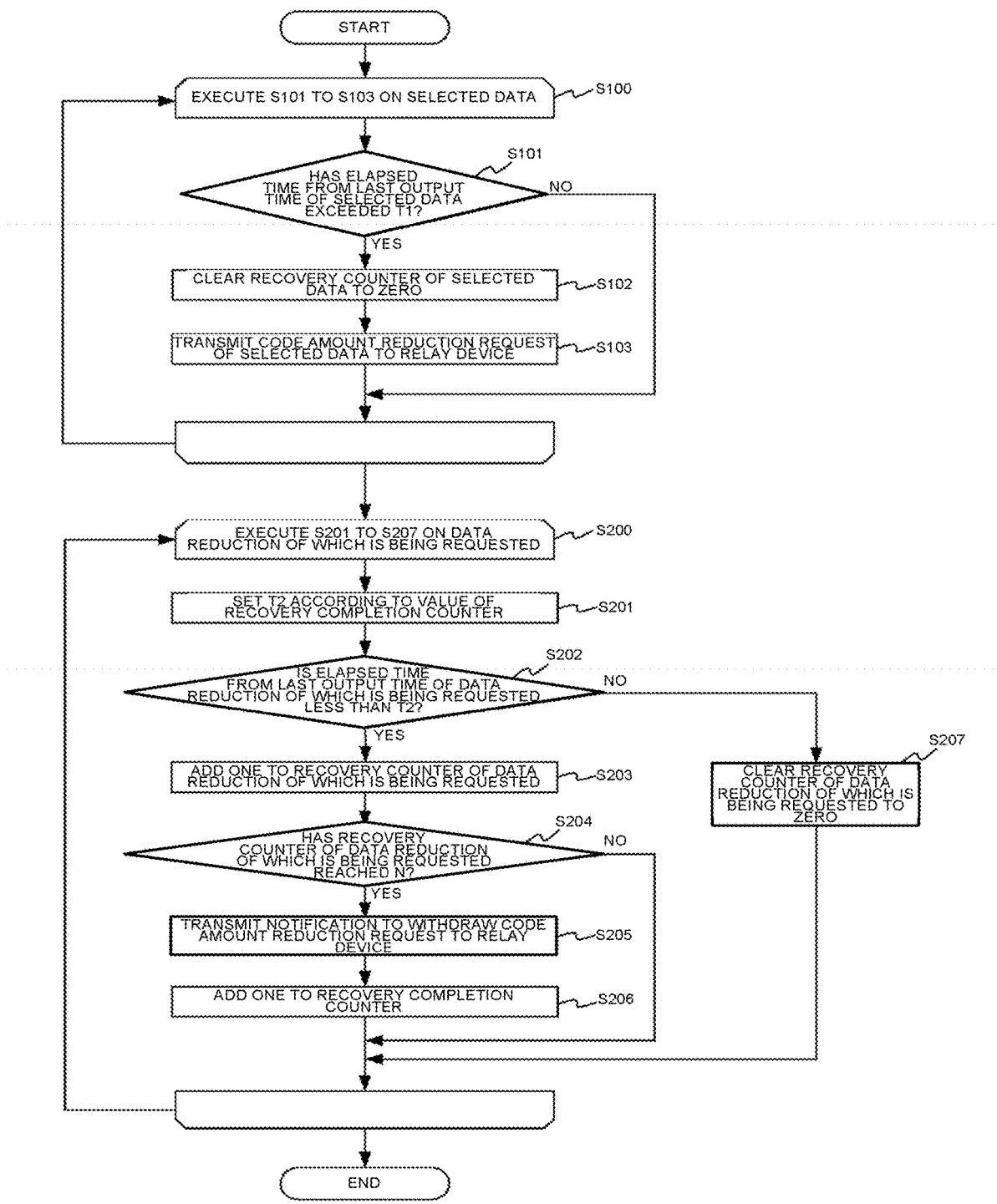
FIG. 17 is a flowchart illustrating a process executed by a code amount change requesting unit according to the present embodiment.

As illustrated in FIG. 17, a routine executed by the code amount change requesting unit 12 includes a first loop process (step S100) and a subsequent second loop process (step S200). The code amount change requesting unit 12 repeatedly executes the routine including the two loop processes at a predetermined timing.

In the first loop process (step S100), the following steps S101 to S103 are executed on n pieces (n=integer equal to or more than one) of selected data that is content data the user wishes to output without delay. At step S101, it is determined whether the elapsed time period from the last output time of the selected data has exceeded a first threshold T1.

As a result, if the elapsed time period from the last output time has not exceeded the threshold T1 (No at step S101), the process returns to step S101, and it is determined whether the elapsed time period from the last output time of the next selected data has exceeded the first threshold T1.

At step S101, if it is determined that the elapsed time period from the last output time has exceeded the threshold T1 (Yes at step S101), a recovery counter for the selected data corresponding to the determination is cleared to zero (step S102). Then, a code amount reduction request of the selected data is transmitted to the relay device 30 (step S103).

Herein, the threshold T1 described above is defined as the upper limit value of the output time interval of the output signal corresponding to the allowable output delay. If the output time interval exceeds the threshold T1, the user senses a delay in image and audio. The threshold T1 may be a common value for both the audio data and image data, or a specific value may be defined for each type of data.

When the first loop process (step S100) is finished for n-pieces of selected data, the process proceeds to the subsequent second loop process (step S200). In the second loop process (step S200), the following steps S201 to S207 are executed on one or more pieces of content data (hereinafter, referred to as data the reduction of which is being requested) that has been the target of the code amount reduction request in the first loop process (step S100).

At step S201, a threshold T2 is set according to the value of a recovery completion counter (a setting method of the threshold T2 will be described below).

At subsequent step S202, the output state management table 700 is referred to calculate the elapsed time period from the difference between the last output time when a value is last stored in the field 704 corresponding to the data the reduction of which is being requested, and the current time. Then, it is determined whether the elapsed time period is less than the threshold T2.

As a result of the determination at step S202, if it is determined that the elapsed time period is not less than the threshold T2 (No at step S202), the process proceeds to step S207, and the recovery counter for the data the reduction of which is being requested, is cleared to zero.

Meanwhile, if it is determined that the elapsed time period is less than the threshold T2 (Yes at step S202), the process proceeds to step S203, and the recovery counter for the data the reduction of which is being requested is incremented by one. Then, at subsequent step S204, it is determined whether the value of the recovery counter has reached a threshold N.

As a result of the determination at step S204, if it is determined that the value of the recovery counter has not reached the threshold N, the process returns to step S201 again, and sets the second threshold T2 for the next selected data.

If it is determined that the value of the recovery counter has reached the threshold N (Yes at step S204), the code amount reduction request withdrawal notification of the selected data corresponding to the recovery counter is transmitted to the relay device 30 (step S205). Then, the recovery completion counter is incremented by one (step S206).

Upon executing the above second loop process (step S200) on all the data the reduction of which is being requested, the first loop process (step S100) will be started again at the next appropriate timing, and the procedure described above will be repeated thereafter.

The threshold T2 set at the previous step 201 will now be described. As is obvious from the above description, in the present embodiment, the recovery completion counter for the selected data is incremented, every time the code amount reduction request withdrawal notification is transmitted to the relay device 30 for certain selected data. In the preferred embodiment, a suitable threshold function is defined so that a smaller value is output as the value of the recovery completion counter becomes greater. This is to prevent unstable control that is caused by transmitting the code amount reduction request and the code amount reduction request withdrawal notification repeatedly and alternately. Then at step S201, the threshold T2 is dynamically set by using the defined threshold function. In the present embodiment, for example, the threshold function indicated by the following formula (1) may be employed.

$$T2 = T2_{init} - [(T2_{init} - T2_{min})/N] \times \text{Recovery completion counter value} \quad (1)$$

In the above formula (1), $T2_{int}$ indicates the initial value, $T2_{min}$ indicates the time interval during which data corresponding to the output signal is transmitted from the transmission source, and N indicates the limit value of the recovery completion times. In this example, $T2_{int}$ needs to be a value sufficiently smaller than the threshold T1, as well as the value larger than $T2_{min}$. The value $T2_{int}$ may be a common value for both the audio data and image data, or a specific value may be defined for each type of data (audio or image).

As is obvious from the above description, in the present embodiment, the code amount change requesting unit 12 transmits a code amount reduction request of the selected data to the relay device, immediately after detecting a sign of output delay (S101, S102, and S103). On the other hand, in view of the stable operation, the withdrawal of the code amount reduction request is carried out after the stable output of the selected data has continued for a predetermined time or more (in other words, the code amount reduction request will not be withdrawn until step S203 in the second loop process has been repeated for N times). Thus, it is preferable to define a suitable value according to the object of the stable operation, for the threshold N that is referred to determine at step S204. Also, in the preceding explanation, the threshold T2 has been suitably optimized. However, the threshold T2 may also be a fixed value, and in this case, a suitable value (a value sufficiently smaller than the threshold T1 as well as larger than $T2_{min}$) according to the object of the stable operation may be obtained experimentally.

In FIG. 17 described above, a method of regularly executing the first loop process (step S100) has been explained. Instead of using this method, the first loop process (step S100) may also be executed at the timing when high priority data (rendering for video, and speaker output for audio) is output to the user. For example, in the first loop process (step S100), the processes from step S101 to step S104 may be executed on the output data with high priority (referred to as data A) that is being received. After the first loop process is executed on the data A described above, the last output time of the data A is updated to the current value, and the process proceeds to the second loop process.

Also, in the second loop process (step S200) in FIG. 17, step S201 to step S207 may be executed every time the data the reduction of which has been requested is output. For example, step S201 to step S206 may be executed on the process on output data B the reduction of which is being requested, and the last output time of the data B is updated to the current value, after executing the process at step S206 or step S207.

In the example of the first loop process, there is a possibility that the detection may fails "when data is output slightly after the threshold" in the case of the checking only performed at regular intervals. Thus, as described above, the process the same as that of the regular check is executed "before" updating the last output time, every time the data to be monitored is output as described above. In this manner, for example, it is possible to operate the control upon detecting a "sign of worsening state" such as it takes four seconds to output data instead of three seconds that is a threshold for determining the blackout. Similarly, in the second loop process, it is possible to make sure that the required process will not be omitted at the timing of the above process performed at regular intervals.

As described above, according to the present invention, it is possible to maintain a stable output of information required by the user, regardless of the cause of the output delay.

The functions of the embodiment described above may be implemented by a device-executable program written in, for example, C, C++, C#, Java (registered trademark). The computer program of the present embodiment can be stored in a device-readable recording medium such as a hard disk device, CD-ROM, magnetic-optical disk (MO), digital versatile disc (DVD), flexible disk, electrically erasable programmable read-only memory (EEPROM), and erasable programmable read-only memory (EPROM) to be distributed, or may be transmitted via a communication network in a possible form by other apparatuses.

Although the present invention has been described above based on the embodiment of the teleconference system, the present invention is not limited to the above embodiment. The present invention may be applied to any data transmission system regardless of use, as long as the system can simultaneously transmit content data between the terminal devices via a communication network. In this case, the terminal device may be a smartphone, a general-purpose personal computer (PC), a tablet terminal, a mobile phone, an electronic blackboard, a projection device such as a projector, and a vehicle navigation terminal mounted on a vehicle, according to the use. It should also be understood that the present invention falls within the scope of the present invention, as long as it exhibits the action and effect of the present invention within the scope of the embodiment that can be easily inferred by those skilled in the art.

REFERENCE SIGNS LIST

1 teleconference system
10 terminal device
12 code amount change requesting unit
13 code amount changing unit 14 last output time updating unit
15 transmission and reception unit
17 communication speed measurement unit
18 CPU usage rate measurement unit
30 relay device
32 relay control unit
34 reduction request history management unit
50 transmission management device
51 transmission and reception unit
52 terminal authentication unit
53 terminal management unit
54 extraction unit
56 terminal state confirmation unit
57 destination list management unit
58 storage device
59 storage/reading processing unit
80 network
101 CPU
102 ROM
103 RAM
104 flash memory
105 SSD
106 recording media
107 media drive
108 operation button
109 power source switch
110 bus line
112 camera
114 microphone
115 speaker
119 external device connection I/F
120 display
120c cable
201 CPU
202 ROM
203 RAM
205 HDD
206 recording media
207 media drive
208 display
210 bus line
211 keyboard
212 mouse
213 CD-ROM
214 CD-ROM drive
500 terminal authentication management table
502 terminal management table
504 destination list management table
600 reduction request history management table
602, 604, 606 field
700 output state management table
702, 704, 706 field
1100 casing
1110 front side wall surface
1120 rear side wall surface
1121 air discharge surface
1130 right side wall surface
1131 sound collecting hole
1140 left side wall surface
1150 operation panel
1151 sound output surface
1160 accommodating unit
1200 arm
1210 torque hinge
1300 camera housing
1310 torque hinge

CITATION LIST

Patent Literature

[Patent Literature 1] Japanese Patent No. 5000141

The invention claimed is:

1. A data transmission system, comprising:
a plurality of terminal devices that are connected to a communication network and that transmit or receive content data among the terminal devices, wherein
at least one of the terminal devices that receives the content data includes processing circuitry configured to
based on an output time interval of an output signal corresponding to predetermined content data, transmit a code amount reduction request to request reduction of a code amount of the predetermined content data while designating a transmission source of the predetermined content data as a destination, and
in response to a code amount reduction request transmitted from another terminal device, reduce a code amount of corresponding content data.

2. The data transmission system according to claim 1, wherein when the output time interval of the output signal corresponding to the predetermined content data exceeds a first threshold, the processing circuitry is further configured to transmit the code amount reduction request with respect to the predetermined content data.

3. The data transmission system according to claim 2, further comprising a relay device that is arranged in the communication network to relay data transmitted or received between at least two terminal devices.

4. The data transmission system according to claim 3, wherein
when the output time interval of the content data is less than a second threshold that is smaller than the first threshold, the processing circuitry is further configured to transmit, to the relay device, a code amount reduction request withdrawal notification to withdraw the code amount reduction request with respect to the predetermined content data while designating the transmission source of the predetermined content data as the destination, and
in response to a code amount reduction request withdrawal notification transmitted from the other terminal device, the processing circuitry is further configured to recover the code amount of the corresponding content data to a state before being reduced.

5. The data transmission system according to claim 4, wherein the processing circuitry is further configured to transmit the code amount reduction request withdrawal notification after a state, in which the output time interval of the predetermined content data is less than the second threshold, continues for a predetermined period of time or more.

6. The data transmission system according to claim 4, wherein
the relay device
includes a reduction request history management memory that holds request history of the code amount reduction request transmitted from each of the terminal devices for each content data, and in response to the code amount reduction request withdrawal notification with respect to the content data, deletes the request history of the terminal device that is a notification source, and transmits the code amount reduction request withdrawal notification of the content data to the transmission source of the content data, when all the request history with respect to the content data have been deleted.

7. The data transmission system according to claim 1, wherein the processing circuitry is further configured to estimate a cause of an output delay based on a network communication speed and a CPU usage rate at a point when the output time interval of the output signal corresponding to the predetermined content data exceeds a first threshold, and transmit the code amount reduction request of the predetermined content data including the estimated cause, and the processing circuitry is further configured to reduce the code amount of the content data by a method according to the cause included in the code amount reduction request.

8. The data transmission system according to claim 7, wherein the processing circuitry is further configured to estimate at least one of a transmission delay and an internal processing delay as the cause, and when the cause is the transmission delay, the processing circuitry is further configured to execute a process of increasing a compression rate of the corresponding content data, and when the cause is the internal processing delay, the processing circuitry is farther configured to execute a process of reducing a sampling rate for audio data, or executes a process of reducing resolution for image data.

9. A terminal device that transmits or receives content data with another terminal device via a communication network, the terminal device comprising:

processing circuitry configured to, based on an output time interval of an output signal corresponding to predetermined content data, transmit a code amount reduction request to request reduction of a code amount of the predetermined content data while designating a transmission source of the predetermined content data as a destination, and in response to a code amount reduction request transmitted from the other terminal device, reduce a code amount of corresponding content data.

10. A method of transmitting or receiving content data between a first terminal device and a second terminal device via a communication network, the method comprising:

a first process of transmitting, by the first terminal device, based on an output time interval of an output signal corresponding to predetermined content data, a code amount reduction request to request reduction of a code amount of the predetermined content data to the second terminal device that is a transmission source of the predetermined content data, and a second process of reducing, by the second terminal device, the code amount of corresponding content data in response to the code amount reduction request.

11. The method according to claim 10, wherein the first process includes a process of transmitting the code amount reduction request with respect to the predetermined content data, when the output time interval of the output signal corresponding to the predetermined content data exceeds a first threshold.

12. The method according to claim 11, further comprising a process of transmitting, by the first terminal device, a code amount reduction request withdrawal notification to withdraw the code amount reduction request with respect to the predetermined content data to the second terminal device, when the output time interval of the content data is less than a second threshold that is smaller than the first threshold after the first process, and a process of recovering, by the second terminal device, the code amount of the corresponding content data to a state before being reduced, in response to the code amount reduction request withdrawal notification.

* * * * *